Dec. 4, 1956 A. FARNIER 2,772,566
DEVICE FOR OBTAINING LIQUID TIGHTNESS OF AN ENCLOSED SPACE
Filed April 20, 1951 4 Sheets-Sheet 1
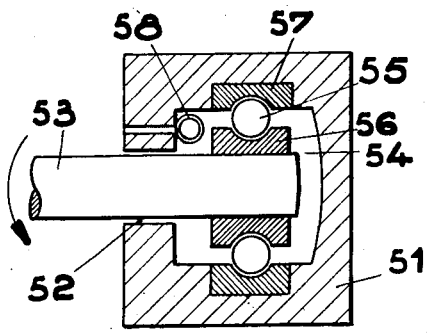
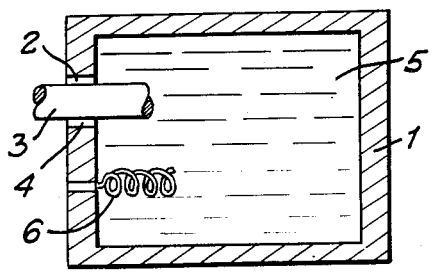
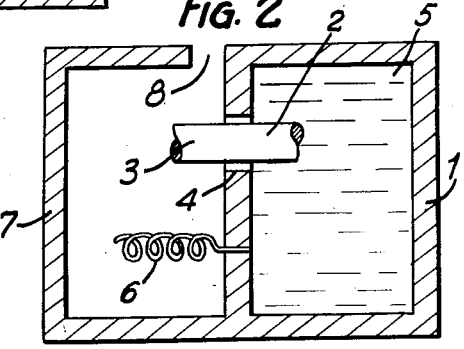
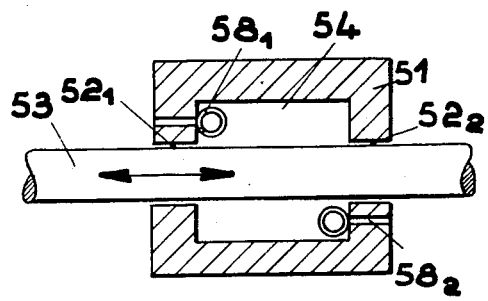
Inventor:
Andre Farnier
by:
Michael S. Striker
agt.

Dec. 4, 1956  A. FARNIER  2,772,566
DEVICE FOR OBTAINING LIQUID TIGHTNESS OF AN ENCLOSED SPACE
Filed April 20, 1951  4 Sheets-Sheet 2

Inventor:
Andre Farnier
by:
Michael S. Striker
agt

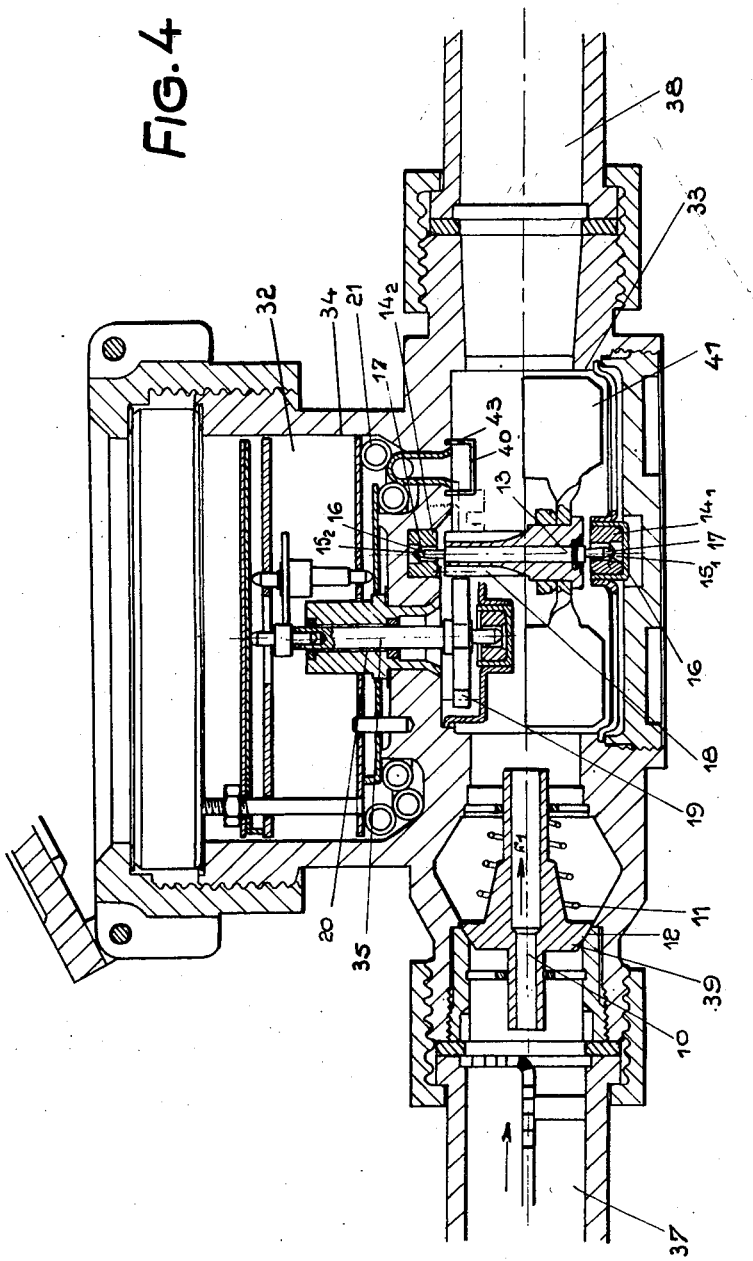

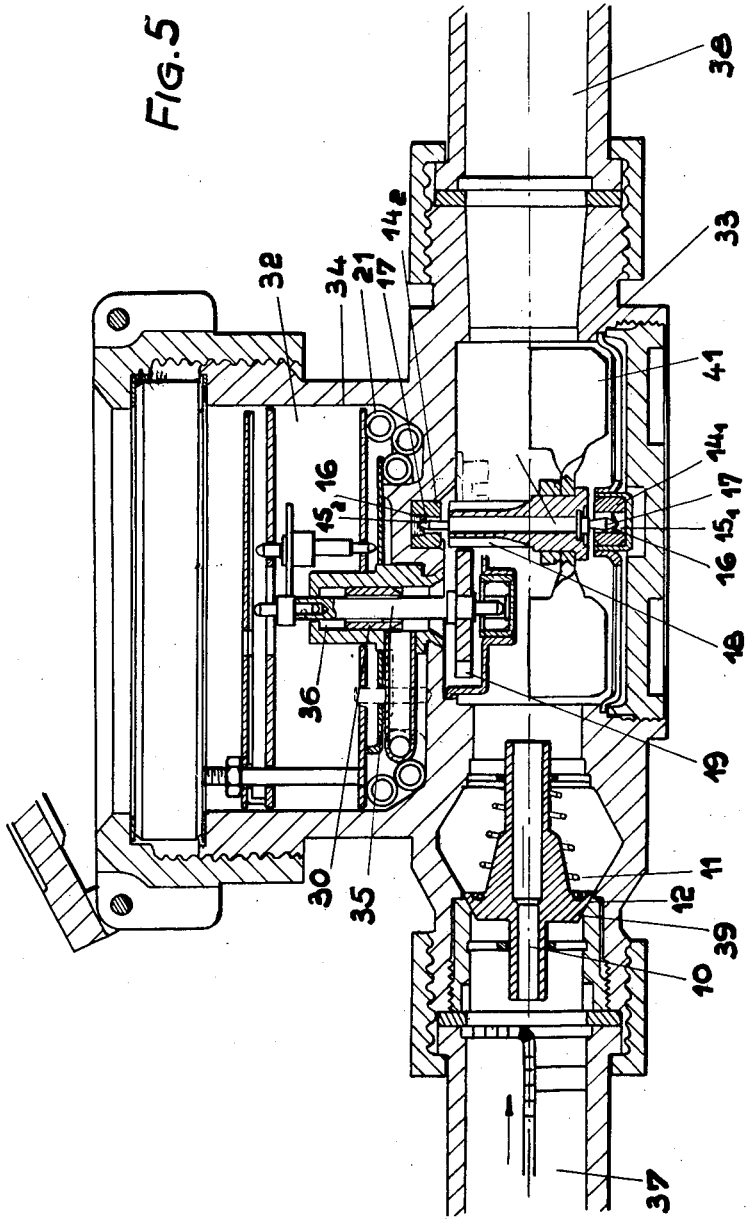

United States Patent Office 2,772,566
Patented Dec. 4, 1956

2,772,566

DEVICE FOR OBTAINING LIQUID TIGHTNESS OF AN ENCLOSED SPACE

Andre Farnier, Boulogne-sur-Seine, France

Application April 20, 1951, Serial No. 221,958

Claims priority, application France April 20, 1950

12 Claims. (Cl. 73—229)

This invention relates to a device for ensuring the liquid and watertightness of an enclosed space. The device comprises a narrow outlet, preferably a capillary communicating channel between the enclosed space, of which it is desired to ensure watertightness, and the exterior, liquid in said capillary communicating channel having a surface tension which is less than that of liquid in the outlet through which it is intended to prevent the flow of liquid. Consequently, when there is an excess liquid pressure within the enclosed space, the liquid tends to enter the channel offering the least resistance, namely, the one constituted by the capillary channel which, owing to its length and capillarity, absorbs the excess liquid, without permitting the latter to pour out towards the exterior. This arrangement ensures excellent watertight conditions.

The invention also relates to applications of the above-mentioned device, more particularly to meters for liquids and bearings.

Meters are already known for liquids, comprising a measuring member such as a turbine, screw, etc., for showing the amount of volume as a function of the speed of the liquid to be measured, and hence, as a function of the delivery.

Meters are also known comprising a member such as a piston, oscillating piston, rotatory piston, all working in cylinders or piston chambers and giving the indications of volume directly as a function of the volume, which indications are created by the movement of the piston.

The measuring member which, in the embodiment of Figure 3, is a turbine, but which can be anything else, transmits its rotatory movement to a counting mechanism which totalizes and registers the quantity of liquid passing through the measuring member.

In the known devices, the measuring member and the counting mechanism are situated in the same chamber or in different chambers communicating with each other. Owing to this, the liquid to be measured comes into contact with counting mechanism members. Thick or opaque liquids, for example, chalky water, cause furring and the progressive choking of the revolving members, commencing with the slowest, as well as jamming of the dial.

In other known meters, the measuring member and a first reduction gear are situated in one chamber or in two chambers communicating with each other and the very slowly moving counting mechanism members are situated in another chamber separated from the preceding ones by a stuffing-box through which an axle passes.

Such an arrangement also has drawbacks, and more particularly the following ones:

(a) Furring of the reduction gear which is immersed in the liquid to be measured, (b) Braking on the axle by friction of the stuffing-box which friction reduces the sensitivity of the meter, and which stuffing-box, after being in use for some time, develops leaks.

Furthermore, in the known devices, the vertical axle of the measuring members revolves in two bearings comprising flat or spherical bottoms, so that there is decided friction between the shaft and bearings.

This invention is intended more particularly to remedy these drawbacks, so as to ensure very great sensitivity of the measuring appliance.

This invention relates to a meter for liquids comprising a counting member driving a counting mechanism which is in a separate enclosed space filled with a suitable liquid, such as oil. The meter is characterized in that the passage in which is journalled an axle or shaft for transmitting the rotational movement of the measuring member to the counting member is situated between the enclosed space of said measuring member and the enclosed space of said counting mechanism. The passage, together with said axle, forms a first capillary channel whose capillarity prevents the oil from descending into the enclosed space of the measuring member, whereas the second capillary communicating channel, with less capillarity than the first channel, ensures a communication between the two said enclosed spaces, without permitting—owing to surface tension— the oil to pass from the space enclosing the counting mechanism to the space enclosing the measuring member. Consequently, when there is an excess liquid pressure prevailing within the enclosed space of the counting mechanism, the oil tends to take the easiest channel, namely, the channel constituted by the second capillary communicating channel, which, owing to its length and capillarity, relieves the excess oil pressure without allowing the oil to overflow into the enclosed space containing the measuring member. This arrangement not only ensures excellent liquidtight conditions between the two said enclosed spaces but also does away with the friction of the transmission axle of the mechanism of the measuring member to the counting mechanism, thereby ensuring great sensitivity of the meter.

The invention also relates to a meter of the preceding type, characterized in that the ends of the vertical axis of the turbine are seated in bearings provided with sapphires having conical hollows receiving the conical ends of said axle, this arrangement enabling friction to be reduced and to still further improve the sensitivity of the meter.

Furthermore, terminal or intermediary bearings are already known which receive either a rotating shaft or a shaft to which a reciprocating movement is imparted. It is known practice to fill this bearing with a lubricating liquid, such as oil or grease, so as to reduce friction and consequent heating up.

To prevent leakage of the lubricant, it is necessary either to provide a stuffing-box through which the shaft which is supported by the bearing passes, or else to lubricate constantly.

This arrangement has disadvantages, particularly the braking of the shaft through friction on the stuffing-box. This causes a partial loss of the advantages obtained by the presence of oil in the bearing.

This invention is intended to overcome this disadvantage.

To this end, it relates to a bearing comprising a cavity filled with oil, this bearing being characterized in that the shaft to which a rotational or reciprocating movement is imparted, forms, with said bearing, a first capillary channel whose capillarity prevents the oil from passing towards the exterior, whereas a second capillary communicating channel with a lower capillarity than the first channel, ensures communication between the enclosed space of the bearing and the exterior, so that when there is an excess liquid pressure prevailing within the enclosed space of the bearing, the oil tends to enter the channel offering the least resistance, i. e., the channel constituted by the second capillary communicating channel, which, owing to its length and capillarity, relieves the excess oil pressure, without permitting the oil to overflow towards the exterior. This arrangement thus provides excellent watertight conditions for the bearing while doing away with friction of the shaft.

The invention also relates to the characteristics hereinafter described, and to their various possible combinations.

Devices in accordance with the invention, meters and bearings, are shown, by way of example, in the attached drawings, in which:

Figure 1 shows a cross-section of a first embodiment of a device ensuring the liquid tightness of an enclosed space with regard to its surroundings.

Figure 2 shows a cross-section of a device having an enclosed space which is liquidtight with regard to an adjacent enclosed space communicating with the exterior.

Figure 4 shows a diagrammatic cross-section elevation of another embodiment of the meter in accordance with the invention.

Figure 5 shows a cross-section elevation of still another embodiment of the meter in accordance with the invention.

Figure 6 shows diagrammatically a cross-section elevation of a terminal bearing for a rotatory shaft.

Figure 7 shows diagrammatically a cross-section elevation of an intermediate bearing for a shaft to which a reciprocating axial movement is imparted.

Figure 3:
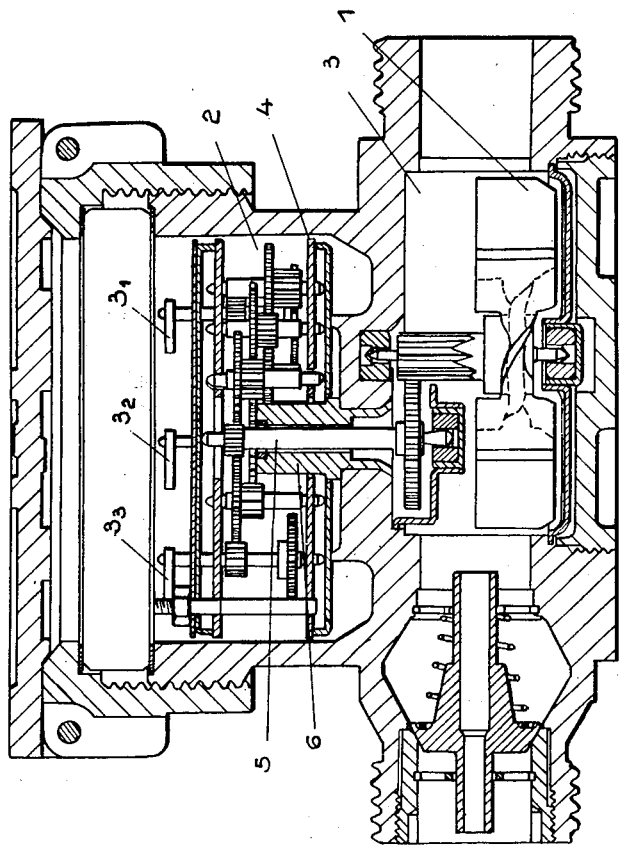
Figure 3 shows a diagrammatic cross-section elevation of one embodiment of the meter in accordance with the invention.

Figure 1 shows an enclosed space 1 comprising an outlet 2 allowing a member 3 to pass therethrough, this member forming an annular channel 4 of very narrow proportions, with the outlet 2. The enclosed space 1 is filled with a liquid 5.

The intention is to prevent any leakage of the liquid 5 through the very narrow annular space formed between the member 3 and the edge of the outlet 2.

To prevent any leakage of this liquid into the outlet 2, there is arranged, in accordance with the invention, a capillary communicating channel 6, which, for example, is in spiral form, so as to ensure communication between the interior of the enclosed space and the exterior. This capillary communicating channel 6 is of sufficiently large section so that the surface tension of liquid within the channel is lower than the surface tension of liquid within the channel arranged between the member 3 and the peripheral wall of the outlet 2 into which the member 3 penetrates.

The device operates in the following manner:

When the pressure of the liquid inside the enclosed space 5 increases, this liquid will flow out through the opening or channel offering the least resistance, i. e., the capillary spiral 6 whose length is such that it can absorb the excess liquid without the latter overflowing towards the exterior.

Owing to this, no liquid flow will take place in the capillary crown comprised between the member 3 and the outlet 2, into which the member 3 penetrates.

This arrangement thus ensures the liquid or watertightness of the enclosed space, without it being necessary to use any device for totally stopping up the space 4 formed between the member 3 and its passage outlet 2.

Figure 2 shows aonther embodiment for securing the watertightness of an enclosed space 1 communicating by an outlet 2 with a second receptacle 7, the latter communicating with the atmosphere by an outlet 8. The outlet 2 is traversed by a member 3 which forms, with the peripheral wall of this outlet, a very small capillary section space 4.

To ensure the watertightness required and prevent any leakage of liquid into the space 4, there is provided between the enclosed space 1 which is filled with the liquid 5 and the enclosed space 7 a capillary communicating channel, the capillarity of which is lower than the capillarity of the space 4.

As already mentioned, the length of the capillary channel 6 formed in an advantageous manner by a spiral is such that it can absorb all excess liquid without the latter overflowing into the enclosed space 7.

As in the preceding case, when the liquid 5 expands, due, for example, to heating up, this liquid will pass into the capillary channel 6, instead of going into the space 4 provided between the member 3 and the passage of the outlet of the said member 3.

The invention also enables the introduction into an enclosed space 1 of a piping such as 3, without it being necessary, for ensuring the watertightness of the enclosed space, to empty the said piping in the walls of the outlet 2 through which it is introduced.

The meter shown in Figures 4 and 5, comprises a measuring member formed by a turbine 41 revolving at a function of the speed of the liquid which traverses the enclosed space 33, in which this turbine is placed. This enclosed space 33 receives, through inlet piping 37, the liquid the delivery of which is required to be measured. This liquid then leaves the enclosed space through a discharge piping 38. Between the chamber 33 containing the turbine 41 and the inlet piping 37, a member is inserted, called a starter member, which is formed by a movable fitting 39 with a small section axial channel. This movable fitting which is normally biased by a spring 11 blocks the entry piping 37, so that as long as the liquid arrives with a low delivery, and consequently at a low pressure, the movable fitting is maintained on its seating 12 and the liquid traverses the axial channel 10 before reaching the measuring member such as the turbine 41.

As the section of this axial channel is small, the speed of the liquid to be measured increases, so that the turbine 41 will turn in spite of the slow delivery speed of the liquid in the delivery piping 37.

When the speed of the liquid increases, its pressure also increases, and the movable fitting, under the action of this pressure, moves in the direction of the arrow $f^1$, compressing spring 11, and establishing communication between the entry piping 37 and the enclosed space 33 containing the measuring members. The turbine 41 is mounted on a vertical axle 13 revolving in a lower bearing $14_1$ and in an upper bearing $14_2$. The bottom of each bearing comprises, in accordance with the invention, the sapphires $15_1$, $15_2$, each having a conical hollow 16 receiving the conical ends 17 of the vertical shaft 13 of the turbine 41. This arrangement brings about a considerable reduction of the friction of the axle and turbine, and consequently, an increase in the sensitivity of the measuring member. Furthermore, the axle of the turbine comprises a pinion 18 meshing with a toothed wheel 19 integral with the shaft 35 transmitting the rotating movement of the turbine to the counting mechanism 32 situated in the enclosed space 34. The enclosed space 34 is filled with oil which must be prevented from leaving the enclosed space 34 containing the counting mechanism and from flowing towards the enclosed space 33 containing the turbine by the channel which may find this oil in the passage outlet of the axle 35 transmitting the movement of the turbine to the counting mechanism.

In accordance with the invention, the axle 35 passes through a circular opening communicating between the enclosed space 33 and the enclosed space 34. This circular opening is of such dimensions that it leaves a channel in the shape of a circular crown 20. The section of this circular crown is such that the capillarity or surface tension in this circular crown is sufficient normally to prevent any leakage of oil into the enclosed space 33. Furthermore, in accordance with the invention, the enclosed space 34 communicates with the enclosed space 33 by a long piping 21 in the shape of a spiral, the spiral having a very small section but much greater than the passage section shaped like a circular crown surrounding the shaft 35, so that the capillarity of the former is lower than that of the circular crown 20. Owing to the capillarity of the tube 21, the oil will not normally flow out through the enclosed space 34 towards the lower enclosed space 33. On the other hand, if the oil pressure increases in the enclosed space 34 (expansion owing to heating up), the latter will flow out through the opening or channel offering the least resistance, i. e., the capillary coil 21 whose length is such that it can absorb the excess oil without the latter flowing into the lower enclosed space 33. Owing to this, it is certain that no oil will flow out into the circular crown 20 surrounding the shaft 35.

Moreover, the liquid to be measured will not be inclined to rise in the upper enclosed space 34 through the coil 21, because the enclosed space 34 is completely filled with oil which is incompressible. Thus there is absolute liquid tightness between the enclosed space 33 containing the measuring member such as the turbine 41 and the enclosed space 34 containing the counting mechanism. Thus liquid tightness is ensured while eliminating the stuffing-boxes usually employed, and consequently the friction of the transmission shaft 35 of the mechanism of the measuring member 41 to the counting mechanism is done away with.

This arrangement therefore affords much greater sensitivity for the measuring appliance and also enables:

(a) The employment of all materials, even oxidizable ones, for the parts of the counting mechanism 32.

(b) The reduction of the volume of the parts owing to the decreased dimensions of the meter.

(c) A meter for using incongealable oil.

It might be feared that with very large deliveries, the turbine 41, revolving at a relatively high speed, would have a tendency to set up suction in the coil 21 through its end which emerges into the enclosed space 33 of said turbine 41.

To this end, in accordance with the invention, the intake of the coil 21 in the enclosed space 33 is protected by a hood 40 having an opening 43. The presence of this hood lessens the suction effect.

Numerous modifications can be applied to the meter described above without going outside the scope of the invention for this purpose. More particularly, the capillary channel 21, instead of directly connecting the upper chamber 34 to the lower chamber 33, can be connected, as shown in Figure 5, in the bore 36 about the shaft 35 for transmitting the movement of the turbine 41 to the mechanism of the counting mechanism 32.

To this end (Figure 5), a packing 30 surrounds the shaft 35 making the capillary channel 20 between said packing and the shaft 35. This packing only partly fills the bore 36. The capillary channel 21 starts flush with the packing 30 and emerges in the bore 36 under this packing.

The bearing shown in Figure 6 consists of a body 51 comprising an opening 52 traversed by the shaft 53 to which a rotation movement is imparted. Inside the body 51 a cavity 54 is provided comprising the ball bearing 55 with rotating crown 56 and fixed crown 57. This cavity 54 is filled with a lubricating liquid such as oil.

To prevent any leakage of oil from the cavity towards the exterior in the narrow passage between the shaft 53 and the periphery of the opening 52, there is provided, in accordance with the invention, a capillary communicating channel 58 having the shape of a coil. This will ensure the existence of a communication between the cavity 54 and the exterior.

This communicating channel has a sufficiently large section so that its capillarity is lower than that of the channel provided between the shaft 53 and the peripheral wall of the opening 52 into which the shaft 53 penetrates.

The device operates in the following manner:

When the oil pressure inside the cavity 54 increases (expansion owing to heating up), this oil will flow out through the opening where the channel offers the least resistance is the easiest, i. e., through the capillary coil 58 whose length is such that it can absorb the excess oil without the latter overflowing towards the exterior. Owing to this, it is certain that no oil will flow out into the capillary crown formed between the shaft 53 and the opening 52 into which this shaft penetrates.

This arrangement thus enables the liquid and watertightness of the bearing to be ensured while eliminating the stuffing-boxes usually employed and consequently doing away with the friction of the shaft 53. Also, a limited quantity of lubricant will therefore be needed.

Figure 7 shows another embodiment of an intermediate bearing for a shaft 53 to which a reciprocating axial movement is imparted.

In accordance with the invention, this bearing consists of a body 51 comprising two openings $52_1$, $52_2$ for the passage of the shaft 53. This body 51 is provided with an internal cavity 54 filled with oil. In accordance with the invention, to prevent any leakage of oil into the space provided between the shaft 53 and the periphery of the openings $52_1$, $52_2$, a capillary communicating channel $58_1$, $58_2$ is provided for each of these openings.

The capillarity of each of these capillary communicating channels is lower than that of the annular passages provided between the shaft 53 and each of its passage openings $52_1$, $52_2$. Moreover, the length of these capillary channels formed in an advantageous manner by a coil, is such that it can absorb any excess oil without the latter operflowing towards the exterior.

As in the preceding case, when expansion occurs, for example, through heating up, the oil will pass into the capillary channels $58_1$, $58_2$, instead of passing into the annular spaces formed between the shaft 53 and the openings of the passages $52_1$, $52_2$.

What I claim is:

1. Leakage preventing apparatus comprising, in combination, a container adapted to be filled with a liquid, said container having a pair of spaced wall portions one of which is formed with an opening passing therethrough; elongated conduit means passing through the other of said wall portions of said container and communicating at one end with the interior of said container and at an opposite end with the exterior of said container, said conduit means having, along a substantial portion thereof, a cross section sufficiently small so that the surface tension of the liquid at said portion of said conduit means is great enough to prevent liquid in said container from flowing through said conduit means, so that when a shaft having a cross section slightly smaller than said opening passes through the latter, with the outer surface of the shaft spaced at said opening from said container by a distance smaller than the greatest dimension of the cross section of said portion of said conduit means, the surface tension of the liquid at said opening in the container prevents the liquid from flowing through the space about the shaft in said opening, whereby, when the liquid in the container expands due to a rise in temperature, the greatest part of the liquid will move into said conduit means because the surface tension of the liquid at said portion of said conduit means is less than the surface tension of the liquid about the shaft.

2. Leakage preventing apparatus as defined in claim 1 and wherein said portion of said conduit means is in the form of a coiled tube located within said container.

3. Leakage preventing apparatus as defined in claim 1 and wherein said portion of said conduit means is in the form of a coiled tube located outside of said container.

4. A liquid meter comprising, in combination, a first container adapted to be filled with oil and including an elongated tubular portion communicating at opposite ends with the interior and exterior of said container, respectively; a counting mechanism located in said first container and including an elongated shaft passing through said tubular portion and being only slightly smaller than the same, said shaft, at that portion thereof which is located in said tubular portion, being spaced at all points from said tubular portion by a distance which is sufficiently small so that the surface tension of the oil at said tubular portion is great enough to prevent the oil from flowing out of said first container through the space about said shaft; a second container located next to said first container and being adapted to have a liquid passing therethrough; a turbine wheel turnably mounted in said second container to be turned by liquid passing therethrough and being operatively connected to said shaft to turn the same; and elongated conduit means passing through a wall portion of said first container and respectively communicating at opposite ends with the interior of said first container and the interior of said second container, said elongated conduit means having, along a substantial portion thereof, a cross section sufficiently small so that the surface tension of the oil at said portion of said conduit means is great enough to prevent oil in said first container from flowing out of the latter through said conduit means, said cross section having its largest dimension greater than said distance between said tubular portion and said shaft.

5. A liquid meter as defined in claim 4 and wherein said portion of said conduit means is in the form of a coiled tube located within said first container.

6. A liquid meter as defined in claim 5 and wherein a hood is located over that end of said conduit means which communicates with said second container to reduce the suction effect of said turbine on said conduit means.

7. A liquid meter as defined in claim 4 and wherein said conduit means communicates with said second container at a free end of said conduit means which is partly located opposite said tubular portion of said first container and partly located beyond said tubular portion of said first container.

8. A liquid meter as defined in claim 7 and wherein said portion of said conduit means is in the form of a coiled tube located within said first container.

9. Leakage preventing apparatus, comprising in combination, a container adapted to be filled with a liquid, said container having a pair of spaced wall portions one of which is formed with an opening passing therethrough; elongated conduit means passing through the other of said wall portions of said container and communicating at one end with the interior of said container and at an opposite end with the exterior of said container, said conduit means having, along a substantial portion thereof, a cross section sufficiently small so that the surface tension of the liquid at said portion of said conduit means is great enough to prevent liquid in said container from flowing through said conduit means; a shaft passing through said opening into the interior of said container and being only slightly smaller than said opening, the outer surface of the portion of said shaft in said opening being spaced at all points from said container at said opening thereof by a distance which is smaller than the greatest dimension of the cross section of said portion of said conduit means so that the surface tension of the liquid at said opening in said container prevents the liquid from flowing through the space about said shaft in said first opening, whereby, when the liquid in the container expands due to a rise in temperature, the greatest part of the liquid will move into said conduit means because the surface tension of the liquid at said portion of said conduit means is less than the surface tension of the liquid about said shaft at said opening; and a bearing located in said container and supporting said shaft for rotation about its own axis and in said opening of said container.

10. Leakage preventing apparatus comprising, in combination, a container adapted to be filled with a liquid, said container having a pair of opposite wall portions each of which is formed with an opening passing therethrough; elongated conduit means passing through the wall of said container and communicating at one end with the interior of said container and at an opposite end with the exterior of said container, said conduit means being associated with said pair of openings and having, along a substantial portion thereof, a cross section sufficiently small so that the surface tension of the liquid is great enough to prevent liquid in said container from flowing through said conduit means; and a shaft extending across the interior of said container and through said openings thereof, said shaft being only slightly smaller than said openings and having outer surface portions in said openings spaced at all points from said container at said openings thereof by a distance which is smaller than the greatest dimension of the cross section of said portion of said conduit means so that the surface tension of the liquid at said openings in said container prevents the liquid from flowing through the spaces about said shaft in said openings, whereby, when the liquid in the container expands due to a rise in temperature, the greatest part of the liquid will move into said conduit means because the surface tension of the liquid at said portion of said conduit means is less than the surface tension of the liquid about said shaft at said openings.

11. Apparatus as defined in claim 1 and wherein a liquid completely fills said container so that pressure of a fluid at the exterior of said container acts through the space about the shaft in said opening of said container and through said conduit means to retain said liquid in said container.

12. Apparatus as defined in claim 11 and wherein said liquid is a lubricating oil.

References Cited in the file of this patent

UNITED STATES PATENTS

| | | |
|---|---|---|
| 470,305 | Martin | Mar. 8, 1892 |
| 528,050 | Westerman | Oct. 23, 1894 |
| 1,474,454 | Telfer | Nov. 20, 1923 |
| 1,495,010 | Ford | May 20, 1924 |
| 2,030,504 | Davis | Feb. 11, 1936 |
| 2,365,515 | Baudry | Dec. 19, 1944 |
| 2,474,865 | Salas | July 5, 1949 |
| 2,511,369 | Petit | June 13, 1950 |